(12) United States Patent
Ambardekar et al.

(10) Patent No.: US 11,315,044 B2
(45) Date of Patent: Apr. 26, 2022

(54) MULTI DIMENSIONAL SCALE ANALYSIS USING MACHINE LEARNING

(71) Applicant: VMWARE, INC., Palo Alto, CA (US)

(72) Inventors: Prashant Ambardekar, Pune (IN); Darshika Khandelwal, Pune (IN); Rushikesh Wagh, Pune (IN); Paryushan Sarsamkar, Pune (IN); Nikhil Bokare, Pune (IN)

(73) Assignee: VMware, Inc., Palo Alto, CA (US)

( * ) Notice: Subject to any disclaimer, the term of this patent is extended or adjusted under 35 U.S.C. 154(b) by 709 days.

(21) Appl. No.: 16/270,614

(22) Filed: Feb. 8, 2019

(65) Prior Publication Data

US 2020/0151609 A1 May 14, 2020

(30) Foreign Application Priority Data

Nov. 8, 2018 (IN) .............................. 201841042134

(51) Int. Cl.
| | |
|---|---|
| G06N 20/10 | (2019.01) |
| G06F 21/60 | (2013.01) |
| G06F 9/50 | (2006.01) |
| H04L 12/801 | (2013.01) |
| H04L 29/06 | (2006.01) |
| G06N 5/00 | (2006.01) |
| G06N 20/00 | (2019.01) |
| H04L 47/127 | (2022.01) |

(52) U.S. Cl.
CPC ........... *G06N 20/10* (2019.01); *G06F 9/5077* (2013.01); *G06F 21/604* (2013.01); *H04L 47/127* (2013.01); *H04L 63/104* (2013.01); *G06F 9/5083* (2013.01); *G06F 2209/5019* (2013.01); *G06N 5/003* (2013.01); *G06N 20/00* (2019.01)

(58) Field of Classification Search
CPC ........ G06N 20/00; G06N 20/10; G06N 20/20; G06N 5/003; G06F 21/604; G06F 9/5077; G06F 2209/5019; G06F 9/5083; G06F 9/5088; H04L 47/127; H04L 63/104
See application file for complete search history.

(56) References Cited

U.S. PATENT DOCUMENTS

| | | | | |
|---|---|---|---|---|
| 2014/0089495 | A1* | 3/2014 | Akolkar | ................ H04L 41/147 709/224 |
| 2017/0109205 | A1* | 4/2017 | Ahuja | ................... G06F 9/5094 |
| 2017/0295224 | A1* | 10/2017 | Tino | ...................... G06F 9/5077 |

OTHER PUBLICATIONS

Wade Holmes, "VMware NSX Micro-segmentation" VCDX#15, CISSP, CCSK; https://www.vmware.com/content/dam/digitalmarketing/vmware/en/pdf/products/nsx/vmware-nsx-microseg mentation.pdf.
Machine learning algorithms : https://blogs.sas.com/content/subconsciousmusings/20 17/04/12/machine-learning-algorithm-use/.

(Continued)

*Primary Examiner* — Shane D Woolwine
(74) *Attorney, Agent, or Firm* — Patterson + Sheridan, LLP (57) ABSTRACT

The disclosure provides an approach for collecting system state data relating to whether certain system states overload a processor assigned to a controller of the system. The approach further involves using the collected data to train a regression machine learning algorithm to predict whether indented or desired system states will result in processor overload. Depending on the prediction, the approach takes one of several steps to efficiently change system state.

20 Claims, 5 Drawing Sheets

(56) References Cited

OTHER PUBLICATIONS

Real world uses of Decision Trees : https://www.tutorialspoint.com/r/r_decision_tree.htm.
Classification and regression trees: https://www.statmethods.net/advstats/cart.html.
Timo Aho et al., "Multi target regression with Rule Ensembles": Journal of Machine Learning Research 13 (2012), 2367-2407; Published Aug. 2012.
"NSX configuration maximums": NSX for vSphere 6.3.6, Updatged on Aug. 8, 2018, VMWARE.
R Studio: https://www.rstudio.com/.
R official website : https://www.r-project.org/about.html.
NSX-v System Scale Dashboard ; https://docs.vmware.com/en/VMware-NSX-Data-Center-for-vSphere/6.4/com.vmware.nsx.admin.doc/GUID-B603189D-F09A-46A8-AD5D-7F899B9CF95E.html.

* cited by examiner

FIG. 1

| SD VMs per SG | Avg VMs per SG | SD SGs per VM | Avg SGs per VM | Config. Δ per min | Scale Score |
|---|---|---|---|---|---|
| 35.60 | 166.40 | 3.46 | 2.95 | 120 | 126 |
| 35.60 | 186.40 | 3.65 | 3.20 | 120 | 1080 |
| 35.60 | 188.40 | 3.60 | 3.12 | 120 | 162 |
| 42.60 | 193.40 | 3.58 | 3.15 | 120 | 376 |
| 42.60 | 195.40 | 3.54 | 3.08 | 240 | 141 |
| 42.60 | 215.40 | 3.68 | 3.30 | 240 | 1034 |
| 44.50 | 217.30 | 3.65 | 3.23 | 240 | 156 |
| 49.50 | 222.30 | 3.53 | 3.26 | 240 | 384 |
| 49.50 | 224.30 | 3.60 | 3.19 | 240 | 132 |

MULTI DIMENSIONAL SCALE ANALYSIS USING MACHINE LEARNING

RELATED APPLICATIONS

Benefit is claimed under 35 U.S.C. 119(a)-(d) to Foreign Application Serial No. 201841042134 filed in India entitled "MULTI DIMENSIONAL SCALE ANALYSIS USING MACHINE LEARNING", on Nov. 8, 2018, by VMware, Inc., which is herein incorporated in its entirety by reference for all purposes.

BACKGROUND

A computing system, such as a data center, may be large and complex, involving a large number of host machines, virtual machines, and groupings of virtual machines into groups. Groups of virtual machines may have rules associated with them, such as allowing virtual machines in one group to communicate with virtual machines in another. The state of a computing system may continually change as new virtual machines are added and removed from groups and from the system. Managing the state of the computing system by a controller can result in high processor load at the controller, slowing down the rate at which changes are propagated throughout the system. Slow or delayed propagation of security changes can compromise security within the system. Predicting which state changes of the computing system would take too long to implement, e.g., because it would require too long to process, can allow for alternate actions, such as not changing computing system state or changing the state in a different way. Such predictions are complex.

SUMMARY

Embodiments of a system described herein will perform a method of predicting load on one or more processors assigned to a controller of a computing system, the computing system comprising a plurality of host machines configured to implement a logical network comprising a plurality of virtual computing instances (VCIs) running on the plurality of host machines, the method comprising: obtaining historical data of the computing system, wherein the historical data comprises utilization rate of one or more processors of the plurality of host machines; training a regression tool using the historical data, wherein the regression tool is a regression machine learning algorithm; obtaining a desired change in system state; based on the desired change, determining a target system state and calculating target system state data; providing target system state data to the regression tool; obtaining, from the regression tool, a prediction of load on the one or more processors of the controller; comparing the prediction to a threshold value; and based at least in part on the comparison, changing a current system state to the target system state.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for collecting system state data and determining whether certain system states or system state changes overload one or more processors assigned to one or more controllers of the system based on the collected data. The approach further involves using the collected data to train a regression machine learning algorithm to predict whether intended or desired system states will result in processor overload. Depending on the prediction, the approach takes one of several steps to efficiently change system state.

Figure 1:
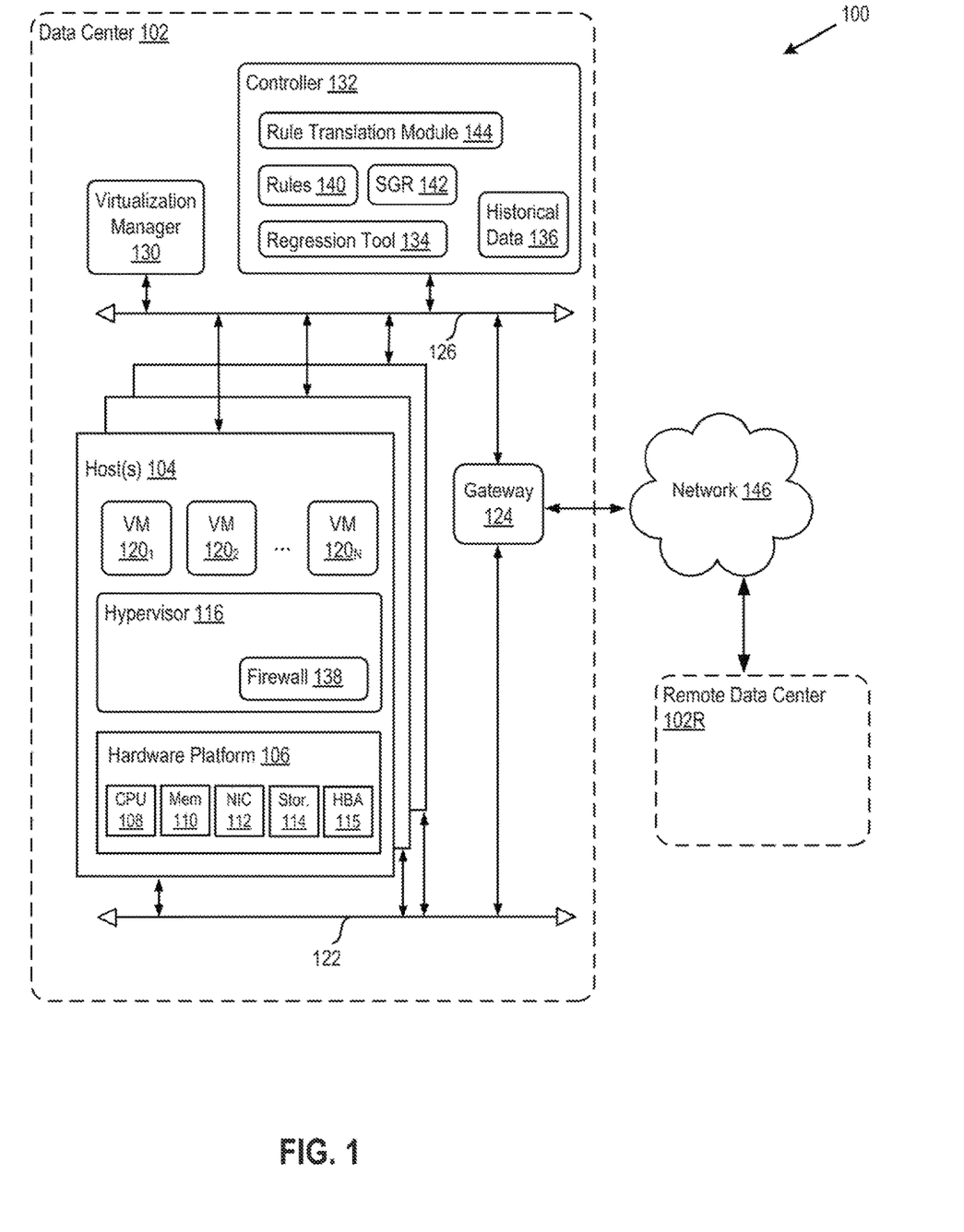
FIG. 1 depicts a block diagram of a computing system in which one or more embodiments of the present disclosure may be utilized.

FIG. 1 depicts a block diagram of a computing system 100 in which one or more embodiments of the present disclosure may be utilized. Computing system 100 includes a data center 102 and optionally a remote data center 102R, connected by a network 146. Network 146 may be, for example, a direct link, a LAN, a wide area network (WAN) such as the Internet, another type of network, or a combination of these. Remote data center 102R may be substantially the same as data center 102, containing substantially the same components with similar functionality as components of data center 102.

Data center 102 includes host(s) 104, a virtualization manager 130, a controller 132, a gateway 124, a management network 126, and a data network 122. Networks 122, 126, in one embodiment, each provide Layer 3 connectivity in accordance with the Open Systems Interconnection (OSI) model, with internal physical switches and routers not being shown. Although the management and data network are shown as separate physical networks, it is also possible in some implementations to logically isolate the management network from the data network, e.g., by using different VLAN identifiers. Each of hosts 104 may be constructed on a server grade hardware platform 106, such as an x86 architecture platform. For example, hosts 104 may be geographically co-located servers on the same rack.

Hardware platform 106 of each host 104 may include components of a computing device such as one or more processors (CPUs) 108, system memory 110, a network interface 112, storage system 114, a host bus adapter (HBA) 115, and other I/O devices such as, for example, USB interfaces (not shown). Network interface 112 enables host 104 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks as shown, and the hosts 104 may be connected to each of the data network 122 and management network 126 via separate NICs or separate ports on the same NIC. In certain embodiments, data network 122 and management network 126 may correspond to the same physical network, but different network segments, such as different VLAN segments.

Storage system 114 represents persistent storage devices (e.g., one or more hard disks, flash memory modules, solid state disks, and/or optical disks). Host bus adapter (HBA) 115 may be provided to couple host 104 to one or more external storages (not shown), such as a storage area network (SAN), by way of a distinct storage network (not shown) or via data network 122, e.g., when using iSCSI or FCoE storage protocols. Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory.

Host 104 is configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 104. In some embodiments, hypervisor 116 can be installed as system level software directly on hardware platform 106 of host 104 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, VMs 120 may be containers that run on host 104 without the use of a hypervisor and separate guest operating systems running on each.

Hypervisor 116 includes an instance of a firewall 138 (e.g., a distributed firewall that is maintained and controlled across multiple hosts 104 by controller 132) that filters network packets arriving at host 104 and outgoing from host 104. Firewall 138, may comprise multiple software modules for filtering network packets by referencing security or firewall settings of firewall 138. Settings of firewall 138 are determined by rules 140 within controller 132, as discussed further below. All or substantially all hypervisors 116 within data center 102 may have a running instance of firewall 138. Hypervisors 116 within remote data center 102R may also have a running instance of firewall 138. In an embodiment, firewall 138 is a firewall internal to data center 102 and manages east-west traffic within data center 102, i.e., not traffic flowing in and out of data center 102. In a second embodiment, firewall 138 is internal to computing system 100 and manages network traffic both east-west and north-south traffic, i.e., traffic within each data center 102/102R and network traffic flowing between data centers 102/102R.

Virtualization manager 130 communicates with hosts 104 via a network, shown as a management network 126, and carries out administrative tasks for data center 102 such as managing hosts 104, managing VMs 120 running within each host 104, provisioning VMs, migrating VMs from one host to another host, and load balancing between hosts 104. Virtualization manager 130 may be a computer program that resides and executes in a central server in data center 102 or, alternatively, virtualization manager 130 may run as a virtual computing instance (e.g., a VM) in one of hosts 104. Though shown as a single unit, it should be understood that virtualization manager 130 may be implemented as a distributed or clustered system. That is, virtualization manager 130 may include multiple servers or virtual computing instances that implement management plane functions.

In one embodiment, virtualization manager 130 includes a hybrid cloud management module (not shown) configured to manage and integrate virtualized computing resources provided by remote data center 102R with virtualized computing resources of data center 102 to form a unified computing platform. Hybrid cloud manager module is configured to deploy VMs in remote data center 102R, transfer VMs from data center 102 to remote data center 102R, and perform other "cross-cloud" administrative tasks. In one implementation, hybrid cloud manager module is a plug-in complement to virtualization manager 130, although other implementations may be used, such as a separate computer program executing in a central server or running in a VM in one of hosts 104.

Gateway 124 provides VMs 120 and other components in data center 102 with connectivity to network 146 used to communicate with remote data center 102R. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 104. Gateway 124 may be a virtual appliance, a physical device, or a software module running within host 104.

Controller 132 manages security settings of distributed firewall 138 within data center 102, and optionally, also manages security settings within remote data center 102R. Controller 132 may be a computer program that resides and executes in a central server in data center 102 or, alternatively, controller 132 may run as a virtual appliance (e.g., a VM) in one of hosts 104. Although shown as a single unit, it should be understood that controller 132 may be implemented as a distributed or clustered system. That is, controller 132 may include multiple servers or virtual computing instances that implement controller functions. Controller 132 is associated with one or more virtual CPUs (not shown) and/or with one or more CPUs 108. Processor(s) resources allotted or assigned to controller 132 may be unique to controller 132, or may be shared with other components of data center 102. Controller 132 communicates with hosts 104 via management network 126.

Controller 132 includes firewall rules 140. Controller 132 manages the security settings within distributed firewall 138 based on firewall rules 140. Firewall rules 140 specify permissions regarding communication between VMs 120 within data center 102 or within computing system 100. In an embodiment, a rule may be a five-tuple consisting of five parameters: "source," "destination," "application," "action,"

and "cluster." "Source" and "destination" parameters may be, for example, Internet protocol (IP) addresses specifying a source VM 120 and a destination VM 120. The "application" parameter may specify that the rule applies to packets sent by or from a specific application, such as for example, a specific accounting software. The "action" parameter may specify what action to take, such as to block a network packet or allow a network packet. The "cluster" parameter may specify that the rule is to be applied to a specific group (also referred to as a cluster) of hosts 104, to the whole data center 102, or to the whole computing system 100. Rules 140 may be stored on a storage medium, such as storage 114 of one of hosts 104.

For example, a rule may specify that all network packets with a source IP address of a first VM 120 and a destination IP address of a second VM 120, sent to or from any application, is to be blocked, and that the rule applies to the first VM 120 and second VM 120 when these VMs are running on any host 104 within computing system 100. For another example, a rule may specify that that all network packets with a source IP address of a first VM 120 and a destination IP address of a second VM 120, sent to or from a specific accounting software, is to be allowed, and that the rule applies to the first VM 120 and second VM 120 when these VMs are running on one of specified ten hosts 104 within data center 102 corresponding to a group.

Rules 140 may be created, changed, and deleted by controller 132, such as by an administrator of data center 102. When rules 140 are modified, controller 132 transmits new security settings to distributed firewall 138. In an embodiment, controller 132 transmits new security settings only to the instances of firewall 138 to which the settings apply.

Controller 132 maintains security group record (SGR) 142, which is a record of security groups (SGs) within data center 102 or computing system 100. A security group may include several VMs 120, and each VM 120 may be part of one or more security groups. Security groups allow for more organized and efficient management of security settings within firewall 138. For example, several VMs 120 may be grouped within a Human Resources (HR) security group, and several other VMs 120 may be grouped within a Research and Development (R&D) security group. Controller 132 may be tasked with creating a setting within firewall 138 specifying that all network traffic between the HR security group and the R&D security group is to be blocked. To accomplish this, in certain embodiments, several rules would need to be created, each rule specifying the IP address of a source VM 120 and the IP address of a destination VM 120, meaning a separate rule for each pair of VMs in the HR security group and the R&D security group. In certain embodiments, rather than create several rules, a single rule may be created specifying that all traffic between two given security groups is to be blocked. This rule is then translated by rule translation module 144 to settings within firewall 138, and the settings are transmitted to firewall 138 by controller 132, as discussed further herein.

SGR 142 may contain information such as (a) a list of security groups within data center 102 or computing system 100, (b) the number of VMs 120 within each security group, and (c) information indicating which VMs 120 are within which security group. SGR 142 may also contain information such as (a) the number of security groups to which each VM 120 belongs within data center 102 or computing system 100, (b) average number of VMs 120 per security group, (c) standard deviation of VMs 120 per security group, (d) average number of security groups per VM 120, and/or (e) standard deviation of the number of security groups per VM 120. SGR 142 may be stored on a storage medium, such as storage 114 of one of hosts 104.

Rule translation module 144 is a component of controller 132 that translates rules 140 into settings of firewall 138. Translation of a pairwise rule to one or more settings may be simple and fast. A pairwise rule is a rule that applies to transmission of network packets between two VMs 120, the first VM being the source VM and the second VM being the destination VM. If the source VM and destination VM are located on different hosts 104, then two separate instances of firewall 138 may need to be updated. If both the source and destination VMs are located on the same host 104, then only the single instance of firewall 138 on that host 104 may need to be updated.

However, translation of a rule to one or more settings may be complex and time consuming if the rule is between one security group of VMs and a second security group of VMs. For example, if the first and second security group each has ten VMs 120, then the rule is equivalent to one hundred pairwise rules. In an embodiment, rule translation module 144 translates such an exemplary rule to one hundred pairwise rules before translating the pairwise rules to new firewall settings or to changes to firewall settings. New settings or changes to firewall settings corresponding to the pairwise rules are then transmitted to the appropriate instance of firewall 138 or to all instances of firewall 138, depending on implementation of firewall 138.

Controller 132 may update settings within firewall 138 when the number of VMs 120 changes. For example, if controller 132 determines that more VMs 120 are needed in order to provide more resources for certain workloads running within data center 102, then controller 132 may request that virtualization manager 130 create additional VMs 120. The newly created VMs 120 may be part of a security group. In this case, SGR 142 and corresponding rules 140 may need to be updated to reflect the addition of new VMs 120. Each instance of firewall 138 may need to be updated to include settings related to the new VMs 120. For example, if new VMs 120 are part of the HR security group, then all or some instances of firewall 138 may need to be updated with settings to block network packets between the new VMs 120 and all VMs within the R&D security group. If the number of new VMs 120 is large, such as for example, one hundred new VMs 120, the process of updating distributed firewall 138 may use a high level of processing resources for an extended period of time to generate and distribute the settings to the instances of distributed firewall 138.

Whether VM 120 belongs to a security group may be determined by tags on VM 120. A tag may be part of an identifier of VM 120 or part of metadata of VM 120. For example, if VM 120 is tagged with "HR," then VM 120 is included within the HR security group. As used herein, a "tag" is synonymous with "membership criteria" of membership to a security group.

Security groups may be organized into two types of security groups: dynamic security groups and static security groups. In a first embodiment, the main difference between dynamic and static security groups is whether controller 132 evaluates whether a given VM 120 belongs to that group when VM 120 is created, when membership criteria (or "tags") for VM 120 are changed, or when a new security group is created. In the first embodiment, when VM 120 is created or when membership criteria for VM 120 are changed, then controller 132 compares membership criteria of VM 120 to membership criteria of each dynamic security group within computing system 100 so as to determine wither VM 120 is a member of that dynamic security group. In this first embodiment, when VM 120 is created or when membership criteria for VM 120 are changed, then controller 132 does not compare membership criteria of VM 120 to membership criteria of each static security group within computing system 100 so as to determine wither VM 120 is a member of that static security group. To add VM 120 as member to a static security group, controller 132 may, for example, receive a command to add VM 120 to the static security group. The command may be sent, for example, by another component of computing system 100 or by an administrator of computing system 100. In this first embodiment, when a new dynamic security group is created along with membership criteria (or "tags") of that dynamic security group, then controller 132 compares membership criteria (or "tags") of each VM 120 to membership criteria of that newly created dynamic security group. In this first embodiment, when a new static security group is created along with membership criteria (or "tags") of that static security group, then controller 132 does not compare membership criteria of each VM 120 to membership criteria of the newly created static security group. The more dynamic security groups are present within data center 102 or computing system 100, and the more tags exist within data center 102 or computing system 100, then the more processing resources are used by controller 132 to update security group memberships within SGR 142 and to propagate security settings to instances of firewall 138 when a new VM 120 is created or when tags of VM 120 are changed.

For example, a dynamic security group may have a membership criterion or a tag of "HR." When a VM 120 is created and tagged with "HR," controller 132 compares the "HR" tag to each dynamic security group within computing system 100 to determine whether the dynamic security group has "HR" as a membership criterion. If so, then controller 132 adds the newly created VM 120 to that security group, such as by updating SGR 142. For a second example, a static security group may have a group or cluster of hosts 104 as a membership criterion. That is, computing system 100 may have twenty hosts 104, and the criterion may be that if VM 120 is hosted on a specified group of four hosts 104, then VM 120 is a member of the static security group. In this second example, when VM 120 is created on one of hosts 104 that belongs to the specified group of four hosts 104, then a cluster manager (not shown) may send a command to controller 132 to add VM 120 to the static security group. The command may contain an identifier of the static security group.

In a second embodiment, a dynamic security group is a security group whose membership changes automatically as new VMs 120 are added to computing system 100, while a static security group is a security group to which VMs 120 are added manually, such as by an administrator.

Security groups may be nested. A security group may have as a membership criterion another security group. That is, if VM 120 is added to security group A, and security groups B and C are both tagged with security group A, then VM 120 is also added to security group B and security group C. Additionally, another security group may be tagged with security group B or C, increasing the depth of nesting. The deeper the nesting, the more processing resources are used by controller 132 to update security group memberships within SGR 142 and to propagate security settings to instances of firewall 138 when a new VM 120 is created or when tags of VM 120 are changed.

Controller 132 has finite processing resources. When controller 132 is overloaded, the processor(s) of controller 132 may begin to operate at a high percent utilization for an extended period of time. The high percent utilization may be, for example, 80%-100% utilization. The period of time may be, for example, five seconds or more. Translation of higher-order rules to pairwise rules, and translation of pairwise rules to firewall settings may overload (e.g., lock up) processor(s) of controller 132 for an extended period of time. During this time, as instances of firewall 138 are updated with new firewall settings, instances of firewall 138 may become inconsistent in their firewall settings. A delay in transmission of updated security settings may compromise security within computing system 100. To prevent overloading processor(s) of controller 132, controller 132 contains a regression tool 134 to predict when overloading might occur.

Regression tool 134 is a supervised machine learning algorithm that can be trained using historical data 136 to calculate an output based on given data. Regression tool 134 may be, for example, a linear regression algorithm, a regression decision tree (e.g., random forest), a neural network, or a support vector regression algorithm. Regression tool 134 is able to output a predictive value that is non-discrete and continuous.

Historical data 136 is compiled by controller 132. Each time that at least one security group or at least one VM is added to or removed from data center 102 or computing system 100, controller 132 collects data on the effect of the addition or removal, and records this data within historical data 136. Historical data 136 may be stored within a data structure, such as for example, a table. Historical data 136 may be stored on a storage medium, such as storage 114 of one of hosts 104. Historical data 136 is used to train regression tool 134.

Figure 2:
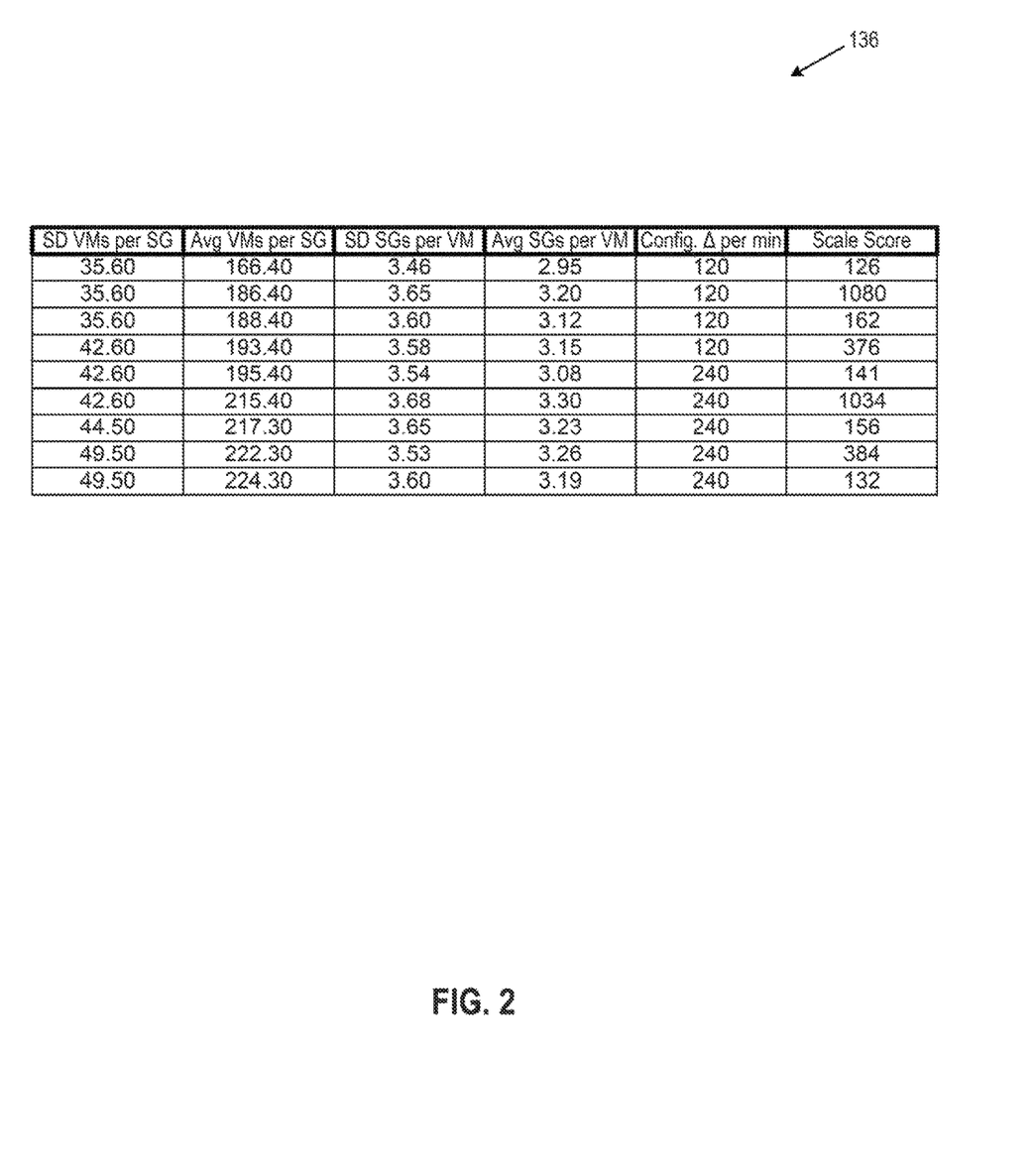
FIG. 2 depicts a block diagram of exemplary historical data, according to an embodiment.

FIG. 2 depicts a block diagram of exemplary historical data 136, according to an embodiment. Each row of exemplary historical data 136 represents an event, such as a removal or addition of at least one security group or VM 120 within data center 102. Each row of historical data 136 may be tagged with metadata containing information as to what event triggered the collection of historical data. For example, the second row of historical data 136 may be tagged with metadata indicating that the second row represents data collected as a result of the addition of two hundred VMs 120 to a given security group. Each row of historical data 136 may also be time-stamped with a date and time of when the data was collected. More specifically, the time stamp may indicate the time at which (a) processor utilization increased above baseline utilization, (b) changes to SGR 142, rules 140, or security settings within firewall 138 began, and/or (c) data of the row is recorded within historical data 136.

Exemplary historical data 136 may include: (a) standard deviation of the number of VMs 120 per security group, (b) average number of VMs 120 per security group, (c) standard deviation of security groups per VM 120, (d) average number of security groups per VM 120, and/or (e) number of configuration changes per minute. In an embodiment, a configuration change may include a change in the number of security groups or the number of VMs 120 within data center 102 or within computing system 100. In a second embodiment, a configuration change may include any change within data center 102 or computing system 100 that changes a security setting of firewall 138.

Historical data 136 also includes a scale score. A scale score is the multiplication product of (a) average processor utilization in the time period during which processor utilization was above baseline processor utilization and (b) the time period during which processor utilization was above baseline processor utilization. The time period may be measured, for example, in seconds. Processor utilization is utilization of the one or more processors allotted or assigned to controller 132. Processor utilization may be measured in, for example, percentage points. Baseline processor utilization is utilization of the processor assigned to controller 132 when controller 132 is not in the process of translating rules 140 to settings of firewall 138, is not in the process of updating SGR 142, and is not in the process of transmitting changes of security settings to firewall 138. Baseline processor utilization represents the steady state utilization of the processor during operation of data center 102.

For example, when a new security group is added or removed from SGR 142, or when a new VM 120 is added to a security group within SGR 142, utilization of processor(s) assigned to controller 132 may spike from a baseline utilization of 20%. The spike may last for five seconds and the average processor utilization of processor assigned to controller 132 may be 50%. The scale score of a row of historical data 136 is the multiplication of the 50% and 5 seconds, which is a scale score of "250."

Although only nine rows are shown within exemplary historical data 136 of FIG. 2, historical data 136 may have many more rows, such as ten thousand rows, a hundred thousand rows, or several million rows.

Figure 3:
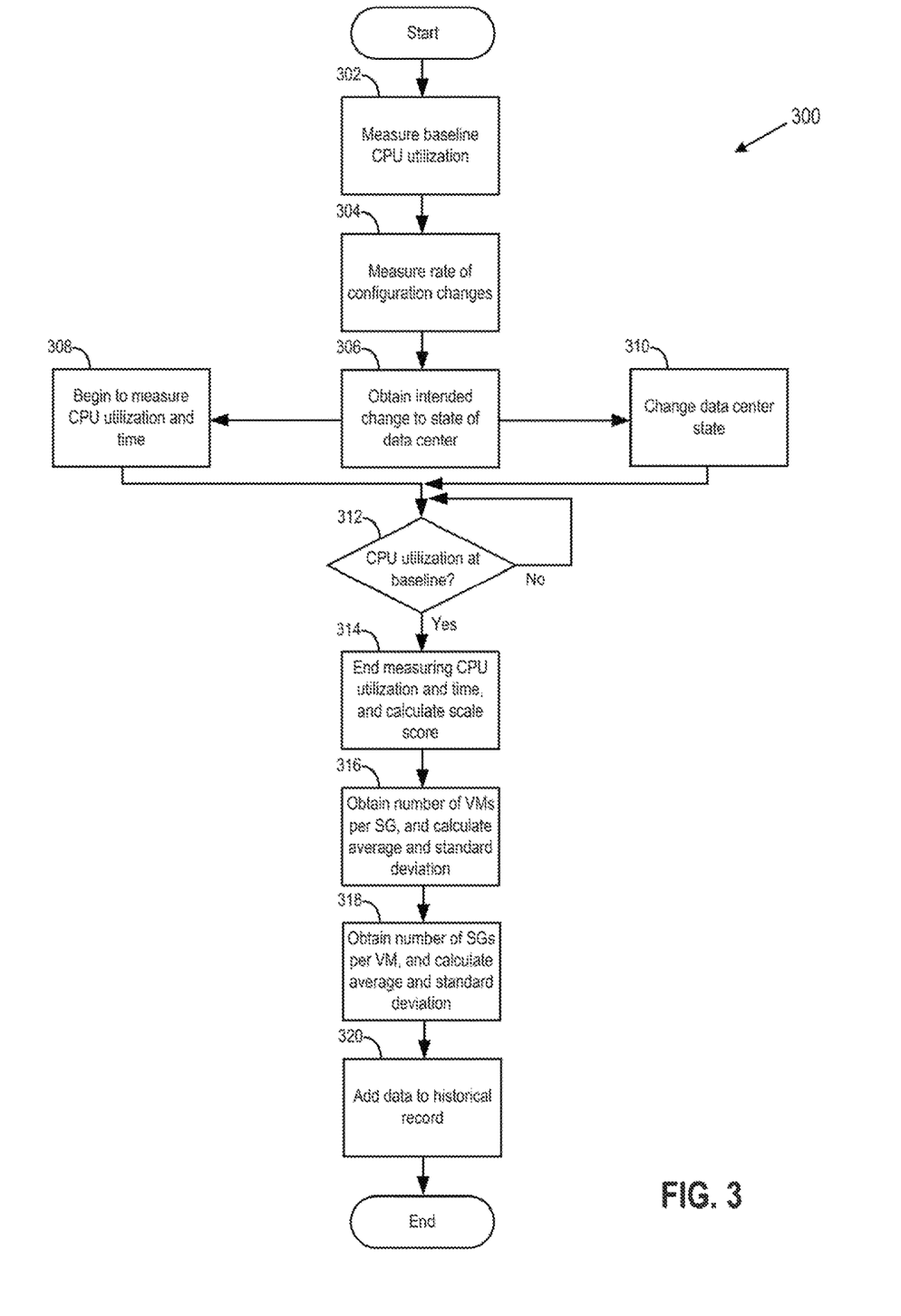
FIG. 3 depicts a flow diagram of a method of collecting historical data, according to an embodiment.

FIG. 3 depicts a flow diagram of a method 300 of collecting historical data 136, according to an embodiment. Specifically, method 300 is a method of collecting data for a single row of exemplary historical data 136 shown in FIG. 2. Method 300 may be performed by controller 132, by a combination of virtualization manager 130 and controller 132, or by another component of data center 102 or computing system 100.

At block 302, baseline utilization percent of processor(s) assigned to controller 132 is measured. Block 302 is performed when controller 132 is not in the process of translating rules 140 to settings of firewall 138, is not in the process of updating SGR 142, and is not in the process of transmitting changes of security settings to firewall 138. That is, block 302 is not performed in parallel with block 308 or 310. Block 302 is performed when the processor(s) assigned to controller 132 is at steady state. Block 302 may be performed by virtualization manager 130, another component of computing system 100, or by controller 132. Block 302 is optional and is not required each time that method 300 executes. Baseline processor utilization may be measured periodically, such as every minute, hour, day, or week.

At block 304, the rate of security configuration changes is measured. In an embodiment, the rate of security configuration changes is measured by, for example, measuring a "count" or the number of objects, such as security groups, that are modified as a result of changing the state of data center 102 or computing system 100. Each change is processed by controller 132. The measurement may be over a predefined time period, such as over a minute, resulting in a "rate" of changes over a period of time. Each row (i.e., event) within historical data 136 may be associated with several changes to objects within data center 102 or computing system 100. Block 304 is optional and is not required each time that method 300 executes. Rate of security configuration changes may be measured periodically, such as every minute, hour, or day.

At block 306, controller 132 determines or receives intended changes to state of data center 102 or computing system 100. For example, controller 132 may determine that in order to properly process a certain workload, ten new VMs 120 must be created and added to the security group associated with that workload. Or, an administrator of data center 102 or computing system 100 may create a new rule within rules 140. After block 306, method 300 performs blocks 308 and 310 in parallel. Block 310 begins substantially at the same time as block 308.

At block 308, a component of data center 102 or computing system 100 begins to measure utilization of the processor(s) assigned to controller 132. The component also measures the time during which the processor utilization is measured. Block 308 may be performed by virtualization manager 130, controller 132, or another component.

At block 310, controller 132 changes security configuration of data center 102 or computing system 100. For example, at block 310, controller 132 may (a) update SGR 142 by adding or removing security groups, (b) update SGR 142 by adding or removing VMs 120 to or from a security group, (c) update rules 140 by adding or removing rules, (d) translate rules 140 to settings of firewall 138, and/or (e) transmit changes of security settings to firewall 138.

At block 312, the component performing block 308 determines whether utilization of processor(s) assigned to controller 132 has returned to baseline. If utilization has returned to baseline, then method 300 continues to block 314. If utilization has not returned to baseline, then method 300 repeats block 312.

At block 314, when utilization of processor(s) assigned to controller 132 returns to baseline, the component performing block 308 stops measuring the processor utilization, and stops measuring the period of time during which the utilization is above baseline utilization. As part of block 314, controller 132 calculates the average processor utilization during the period of time when processor utilization was above baseline. Also as part of block 314, controller 132 calculates a scale score for performing the functions of block 310. The scale score is calculated by multiplying (a) the average processor utilization, and (b) the period of time during which processor utilization was above baseline.

At block 316, controller 132 obtains the number of VMs 120 per security group. Controller 132 may obtain this information by accessing SGR 142, or by querying hosts 104 or hypervisors 116 within data center 102 or computing system 100. After obtaining information on the number of VMs 120 in each security group within data center 102 or computing system 100, controller 132 calculates metrics such as: (a) average number of VMs 120 per security group, and (b) standard deviation of VMs 120 per security group.

At block 318, controller 132 obtains the number of security groups per VM 120. Controller 132 may obtain this information by accessing SGR 142, or by querying hosts 104 or hypervisors 116 within data center 102 or computing system 100. After obtaining information on the number of security groups to which each VM 120 belongs, controller 132 calculates metrics such as: (a) average number of security groups per VM 120, and (b) standard deviation of the number of security groups per VM 120.

At block 320, controller 132 creates a row within historical data 136, similar to one of the rows shown in FIG. 2. The data within the row includes information obtained and/or calculated at blocks 304, 314, 316, and 318. The data added to a row of historical data 136 includes: (a) standard deviation of VMs 120 per security group from block 314, as shown in column 1 of FIG. 2, (b) average number of VMs 120 per security group from block 314, as shown in column 2 of FIG. 2, (c) standard deviation of the number of security groups per VM 120 from block 318, as shown in column 3 of FIG. 2, (d) average number of security groups per VM 120 from block 318, as shown in column 4 of FIG. 2, (e) rate of security configuration changes from block 304, as shown in column 5 of FIG. 2, and/or (f) scale score from block 314, as shown in column 6 of FIG. 2. The data in each row of historical data 136 are used as parameters to train regression tool 134, as discussion below with reference to FIG. 4.

Figure 4:
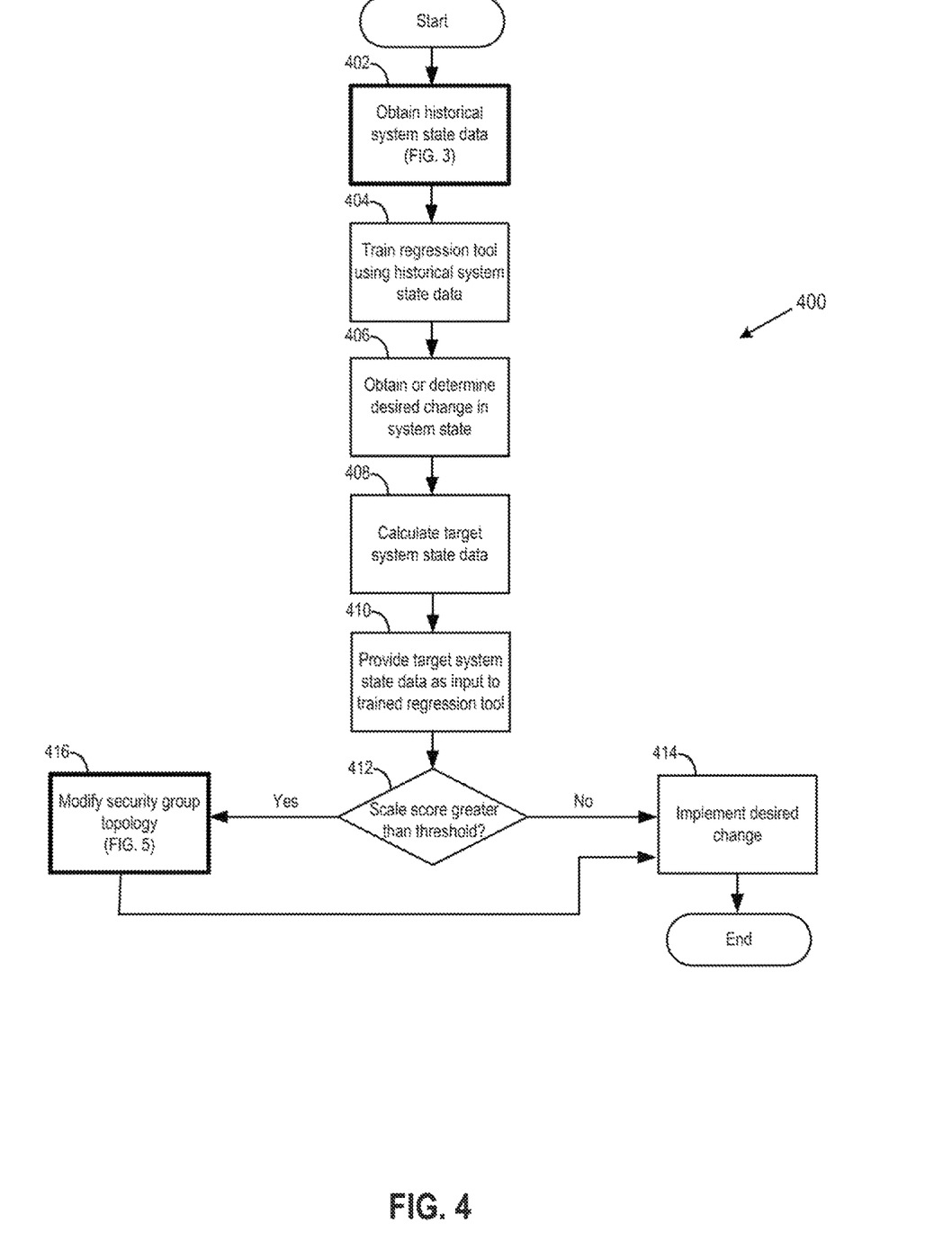
FIG. 4 depicts a flow diagram of a method of training a regression tool and using the trained regression tool to predict processor load, according to an embodiment.

FIG. 4 depicts a flow diagram of a method 400 of training regression tool 134 and using the trained regression tool 134 to predict processor load, according to an embodiment. Method 400 may be performed by controller 132 or by another component within data center 102 or computing system 100.

At block 402, controller 132 obtains historical data 136. Historical data 136 may be obtained by accessing collected historical data 136. Historical data 136 may be collected by executing method 300 of FIG. 3 many times, such as for example, several thousand or several million times.

At block 404, controller 132 trains regression tool 134 using historical data 136. During training, the training input values may be values (a) through (e) described above with reference to block 320 of FIG. 3. The training output value may be the scale score.

Blocks 402 and 404 do not need to be performed each time that method 400 executes. Blocks 402 and 404 may be performed once or periodically, and blocks 406 through 418 of method 400 may be performed each time that method 400 executes, and/or each time that a new prediction regarding processor utilization is to be made.

At block 406, controller 132 receives or determines a desired change in system state. For example, controller 132 may determine that a certain security group, such as the HR security group, should have fifty additional VMs 120 added to it so as to more efficiently process workloads of the HR security group. For another example, an administrator of data center 102 may decide to split a given security group into several smaller security groups, and the administrator may send such a request to controller 132.

At block 408, controller 132 calculates target system state based on the desired change received at block 406. That is, controller 132 calculates metrics of data center 102 or computing system 100 that would exist if the desired change from block 406 were implemented. For example, if the desired change is to have a certain security group increase by two hundred VMs 120, then controller 132 calculates what the following metrics would be for data center 102 or for computing system 100 if the two hundred VMs 120 were added to the security group: (a) standard deviation of VMs 120 per security group, (b) average number of VMs 120 per security group, (c) standard deviation of the number of security groups per VM 120, (d) average number of security groups per VM 120, and/or (e) rate of security configuration changes. A combination of these metrics may represent a target system state.

At block 410, controller 132 provides the calculated metrics from block 408 as input parameters to trained regression tool 134. Regression tool 134 executes and outputs a scale score, which may be a continuous, non-discrete value. As part of block 310, regression tool 134 provides the scale score to controller 132.

At block 412, controller 132 compares the scale score to a threshold and determines whether the output scale score is above the threshold. In an embodiment, if the output scale score is above the threshold, then this indicates that the desired change of block 406 would cause the processor(s) assigned to controller 132 to be too overloaded for too long of a period of time. The threshold may be determined automatically by controller 132 by analyzing historical data 136, or the threshold may be determined by an administrator. If the output scale score is not higher than the threshold, then method 400 continues to block 414. If the output scale score is higher than the threshold, then method 400 continues to block 416, which is described in detail with reference to FIG. 5, below. Optionally, if the output scale score is higher than the threshold, rather than continuing to block 416, method 500 may end or display a warning to an administrator. The warning may provide the administrator a choice from among several options, and the options may include (a) end method 400, (b) continue to block 414 of method 400, or (c) continue to block 416 of method 400.

At block 414, controller 132 implements the desired change in system state, the desired change having been obtained or determined at block 406. Block 414 is performed similarly to block 310 of method 300. That is, controller 132 may (a) update SGR 142 by adding or removing security groups, (b) update SGR 142 by adding or removing VMs 120 to or from a security group, (c) update rules 140 by adding or removing rules, (d) translate rules 140 to settings of firewall 138, and/or (e) transmit changes of security settings to firewall 138. After block 414, method 400 ends.

At block 416, controller 132 modifies topology of security groups within data center 102 or computing system 100. "Topology" of security groups is determined by labels of security groups as static or dynamic, and by membership criteria of each security group. Block 416 is described in detail with reference to FIG. 5.

Figure 5:
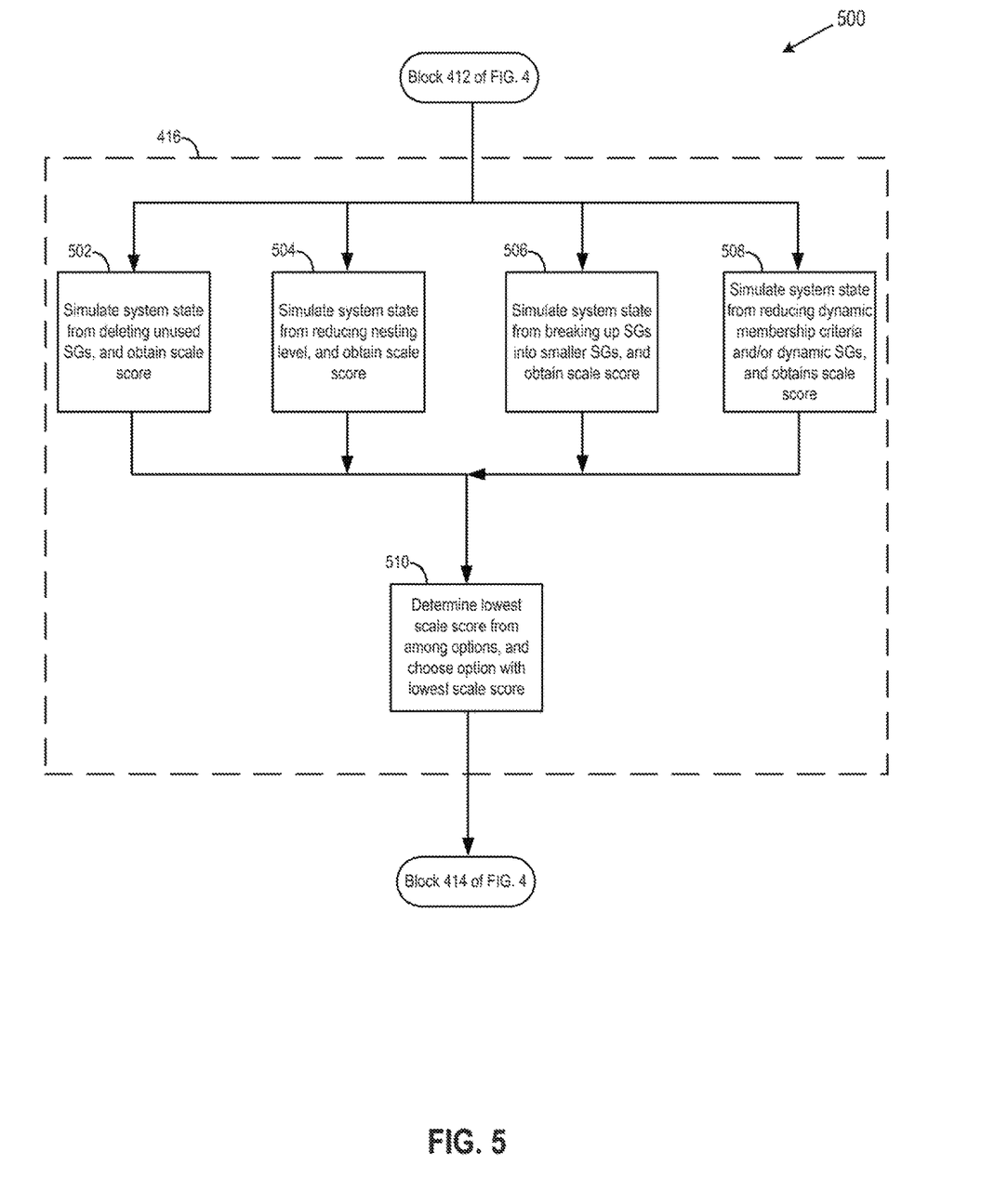
FIG. 5 depicts a flow diagram of a method of modifying security group topology of a computing system, according to an embodiment.

FIG. 5 depicts a flow diagram of a method 500 of modifying security group topology of a computing system 100, according to an embodiment. Method 500 is an expanded view of block 416 of method 400.

Method 500 begins by executing blocks 502, 504, 506, and 508. The blocks may be executed in parallel or in sequence. Each of blocks 502, 504, 506, and 508 represents an option for changing security group topology of data center 102 or computing system 100 so that when the desired change of block 406 is implemented in block 414, processor resources of controller 132 are not overloaded for too long of a period of time. Each of blocks 502, 504, 506, and 508 is a slightly modified repetition of blocks 406-410 of method 400.

At block 502, controller 132 may simulate what system state of data center 102 or computing system 100 would be if (a) unused security groups were deleted, and then (b) the desired change of block 406 is implemented. Unused security groups are security groups that are not found within rules 140. That is, unused security groups are not used by any security rules 140. Deleting unnecessary or unused groupings of VMs may change several metrics as compared to the metrics that were calculated at block 408 of method 400. For example, deleting unused security groups may change some or all of (a) standard deviation of the number of VMs 120 per security group, (b) average number of VMs 120 per security group, (c) standard deviation of security groups per VM 120, or (d) average number of security groups per VM 120.

As part of block 502, controller 132 calculates target system state based on deleting unused security groups and on implementing the desired change of block 406. Target system state may be obtained by calculating the metrics listed above with reference to block 408 and shown in FIG. 2. As part of block 502, controller 132 provides the calculated metrics as input parameters to trained regression tool 134. Regression tool 134 executes and outputs a scale score, and provides the scale score to controller 132.

At block 504, controller 132 may simulate what system state of data center 102 or computing system 100 would be if (a) security group nesting depth were reduced, and then (b) the desired change of block 406 is implemented. Nesting depth may be reduced by removing some or all security group membership criteria where the criteria is membership in another security group. Determining which nested membership criteria to remove may be determined by various methods, such as for example, removing all nested membership criteria that are three or more levels of nesting deep. Reducing nesting depth may change several metrics as compared to the metrics that were calculated at block 408 of method 400, such as for example, the metrics listed above with reference to block 502.

As part of block 504, controller 132 calculates target system state based on reducing nesting of security groups and on implementing the desired change of block 406. Target system state may be obtained by calculating the metrics listed above with reference to block 408 and shown in FIG. 2. As part of block 504, controller 132 provides the calculated metrics as input parameters to trained regression tool 134. Regression tool 134 executes and outputs a scale score, and provides the scale score to controller 132.

At block 506, controller 132 may simulate what system state of data center 102 or computing system 100 would be if (a) some or all security groups are broken up into smaller security groups, and then (b) the desired change of block 406 is implemented. Determining which security groups to break up into smaller groups may be determined by various methods, such as for example, splitting into two security groups each security group that is in the top 10% of security group size. Breaking up security groups into smaller security groups may change several metrics as compared to the metrics that were calculated at block 408 of method 400, such as for example, the metrics listed above with reference to block 502.

As part of block 506, controller 132 calculates target system state based on reducing nesting of security groups and on implementing the desired change of block 406. Target system state may be obtained by calculating the metrics listed above with reference to block 408 and shown in FIG. 2. As part of block 506, controller 132 provides the calculated metrics as input parameters to trained regression tool 134. Regression tool 134 executes and outputs a scale score, and provides the scale score to controller 132.

At block 508, controller 132 may simulate what system state of data center 102 or computing system 100 would be if (a) the number of dynamic security groups is reduced and/or if the total number of membership criteria of dynamic security groups within data center 102 or computing system 100 is reduced, and then (b) the desired change of block 406 is implemented. The number of dynamic security groups may be reduced by, for example, converting a dynamic security group to a static security group. The number of security group membership criteria within data center 102 or computing system 100 may be reduced by, for example, obtaining a list of all dynamic security group membership criteria, determining which membership criteria may be removed, and removing those criteria. Determining which membership criteria may be removed may be performed, for example, by determining which membership criteria are least used, or by prompting an administrator to choose which membership criteria to remove. Reducing the number of dynamic security groups or the number of dynamic membership criteria may change several metrics as compared to the metrics that were calculated at block 408 of method 400, such as for example, the metrics listed above with reference to block 502.

As part of block 508, controller 132 calculates target system state based on reducing the number of dynamic security groups and/or the total number of membership criteria, and on implementing the desired change of block 406. Target system state may be obtained by calculating the metrics listed above with reference to block 408 and shown in FIG. 2. As part of block 508, controller 132 provides the calculated metrics as input parameters to trained regression tool 134. Regression tool 134 executes and outputs a scale score, and provides the scale score to controller 132.

At block 510, controller 132 determines which scale score of blocks 502, 504, 506, and 508 is lowest. Controller 132 then chooses the option simulated at the block with the lowest scale score for changing the state of data center 102 or computing system 100, and at block 414, controller implements that option. For example, if block 502 produces the lowest scale score, then at block 414, controller 132 deletes unused security groups and then implements the desired change of block 406.

In an embodiment, all block 502, 504, 506, and 508 are executed, while in other embodiment some of blocks 502, 504, 506, and 508 are executed and/or additional options are executed. Another option may include creating a second instance of controller 132 to perform some or all of method 400, such as performing block 414 of method 400. Another option may include allocating an additional one or more processors to controller 132.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of predicting load on one or more processors assigned to a controller of a computing system, the computing system comprising a plurality of host machines configured to implement a logical network comprising a plurality of virtual computing instances (VCIs) running on the plurality of host machines, the method comprising:

obtaining historical data of the computing system, wherein the historical data comprises utilization rate of one or more processors of the plurality of host machines;

training a regression tool using the historical data, wherein the regression tool is a regression machine learning algorithm;

obtaining a desired change in system state;

based on the desired change, determining a target system state and calculating target system state data;

providing target system state data to the regression tool;

obtaining, from the regression tool, a prediction of load on the one or more processors of the controller;

comparing the prediction to a threshold value; and based at least in part on the comparison, changing a current system state to the target system state.

2. The method of claim 1, wherein the computing system comprises security groups, wherein each of the security groups comprises one or more VCIs of the plurality of VCIs, the method further comprising, prior to the changing the current system state to the target system state, performing at least one of the following options:

(a) deleting unused security groups from the computing system;

(b) reducing nesting level of the security groups;

(c) breaking up at least some of the security groups into smaller security groups; or (d) reducing a number of dynamic security groups or a number of membership criteria of the dynamic security groups.

3. The method of claim 2, further comprising choosing among the options to perform, wherein the chosen option is determined based on simulating each option using the regression tool.

4. The method of claim 1, further comprising, prior to the changing the current system state to the target system state, performing at least one of:
(a) allocating an additional one or more processors to the controller;
(b) creating a second controller to perform at least some of the changing the current system state to the target system state; or
(c) providing a warning to a user regarding load on the one or more processors.

5. The method of claim 1, wherein each host machine of the plurality of host machines comprises a hypervisor, each hypervisor comprising an instance of a distributed firewall that is distributed throughout the plurality of host machines, wherein the changing the current system state to the target system state comprises changing security settings within at least one instance of the distributed firewall.

6. The method of claim 1, wherein the obtaining historical data comprises:
measuring baseline utilization the one or more processors;
measuring a rate of configuration changes within the computing system;
obtaining an intended change to the computing system;
measuring a utilization of the one or more processors while implementing the intended change; and
measuring a duration of implementing the intended change.

7. The method of claim 6, wherein the computing system comprises a plurality of security groups, wherein each of the plurality of security groups comprises one or more of the plurality of VCIs, the method further comprising:
calculating (a) an average number of VCIs per security group, (b) a standard deviation of VCIs per security group, (c) an average number of security groups to which each VCI belongs, and (d) standard deviation of a number of security groups to which each VCI belongs.

8. The method of claim 1, wherein the computing system comprises a plurality of security groups, wherein each of the plurality of security groups comprises one or more of the plurality of VCIs, and wherein the desired change in system state comprises (a) an addition or removal of a VCI from at least one of the plurality of security groups, or (b) an addition or removal of a security group.

9. The method of claim 1, wherein the regression tool is a regression decision tree.

10. A non-transitory computer readable medium comprising instructions to be executed in a processor of a computer system, the instructions when executed in the processor cause the computer system to carry out a method of predicting load on one or more processors assigned to a controller of a computing system, the computing system comprising a plurality of host machines configured to implement a logical network comprising a plurality of virtual computing instances (VCIs) running on the plurality of host machines, the method comprising:
obtaining historical data of the computing system, wherein the historical data comprises utilization rate of one or more processors of the plurality of host machines;
training a regression tool using the historical data, wherein the regression tool is a regression machine learning algorithm;
obtaining a desired change in system state;
based on the desired change, determining a target system state and calculating target system state data;
providing target system state data to the regression tool;
obtaining, from the regression tool, a prediction of load on the one or more processors of the controller;
comparing the prediction to a threshold value; and
based at least in part on the comparison, changing a current system state to the target system state.

11. The non-transitory computer readable medium of claim 10, wherein the computing system comprises security groups, wherein each of the security groups comprises one or more VCIs of the plurality of VCIs, the method further comprising, prior to the changing the current system state to the target system state, performing at least one of the following options:
(a) deleting unused security groups from the computing system;
(b) reducing nesting level of the security groups;
(c) breaking up at least some of the security groups into smaller security groups; or
(d) reducing a number of dynamic security groups or a number of membership criteria of the dynamic security groups.

12. The non-transitory computer readable medium of claim 11, wherein the method further comprises choosing among the options to perform, wherein the chosen option is determined based on simulating each option using the regression tool.

13. The non-transitory computer readable medium of claim 10, wherein the method further comprises, prior to the changing the current system state to the target system state, performing at least one of:
(a) allocating an additional one or more processors to the controller;
(b) creating a second controller to perform at least some of the changing the current system state to the target system state; or
(c) providing a warning to a user regarding load on the one or more processors.

14. The non-transitory computer readable medium of claim 10, wherein each host machine of the plurality of host machines comprises a hypervisor, each hypervisor comprising an instance of a distributed firewall that is distributed throughout the plurality of host machines, wherein the changing the current system state to the target system state comprises changing security settings within at least one instance of the distributed firewall.

15. The non-transitory computer readable medium of claim 10, wherein the obtaining historical data comprises:
measuring baseline utilization the one or more processors;
measuring a rate of configuration changes within the computing system;
obtaining an intended change to the computing system;
measuring a utilization of the one or more processors while implementing the intended change; and
measuring a duration of implementing the intended change.

16. The non-transitory computer readable medium of claim 15, wherein the computing system comprises a plurality of security groups, wherein each of the plurality of security groups comprises one or more of the plurality of VCIs, the method further comprising:

calculating (a) an average number of VCIs per security group, (b) a standard deviation of VCIs per security group, (c) an average number of security groups to which each VCI belongs, and (d) standard deviation of a number of security groups to which each VCI belongs.

17. The non-transitory computer readable medium of claim 10, wherein the computing system comprises a plurality of security groups, wherein each of the plurality of security groups comprises one or more of the plurality of VCIs, and wherein the desired change in system state comprises (a) an addition or removal of a VCI from at least one of the plurality of security groups, or (b) an addition or removal of a security group.

18. The non-transitory computer readable medium of claim 10, wherein the regression tool is a regression decision tree.

19. A computing system comprising:

a controller of the computing system;

a plurality of host machines configured to implement a logical network comprising a plurality of virtual computing instances (VCIs) running on the plurality of host machines; and one or more processors assigned to the controller, wherein the one or more processors is programmed to carry out a method of predicting load on the one or more processors, the method comprising:

obtaining historical data of the computing system, wherein the historical data comprises utilization rate of one or more processors of the plurality of host machines;

training a regression tool using the historical data, wherein the regression tool is a regression machine learning algorithm;

obtaining a desired change in system state;

based on the desired change, determining a target system state and calculating target system state data;

providing target system state data to the regression tool;

obtaining, from the regression tool, a prediction of load on the one or more processors of the controller;

comparing the prediction to a threshold value; and based at least in part on the comparison, changing a current system state to the target system state.

20. The computing system of claim 19, wherein the computing system further comprises security groups, wherein each of the security groups comprises one or more VCIs of the plurality of VCIs, the method further comprising, prior to the changing the current system state to the target system state, performing at least one of the following options:

(a) deleting unused security groups from the computing system;

(b) reducing nesting level of the security groups;

(c) breaking up at least some of the security groups into smaller security groups; or (d) reducing a number of dynamic security groups or a number of membership criteria of the dynamic security groups.

\* \* \* \* \*